Patented Oct. 25, 1938

2,134,453

UNITED STATES PATENT OFFICE 2,134,453

MORDANT AZO-DYESTUFFS AND A PROCESS FOR MAKING SAME

Max Müller and Roger Ratti, Basel, Switzerland, assignors to the firm Durand & Huguenin S. A., Basel, Switzerland No Drawing. Application April 12, 1937, Serial No. 136,510. In Germany April 20, 1936

24 Claims. (Cl. 260—151)

This invention relates to the manufacture of valuable mordant ortho-hydroxyazo-dyestuffs by combining a diazo compound of an ortho-aminophenol or a substitution product thereof with a 1:8-aminonaphtholsulphonic acid in which the amino group is substituted by a radical —SO$_2$-aryl-ortho-hydroxycarboxylic acid, especially a condensation product of a salicylic acid sulphochloride with a 1:8-aminonaphtholsulphonic acid.

The new dyestuffs are of particular value in the form of their complex metal compounds, into which they can easily be converted by treatment with suitable compounds yielding metal according to known methods.

For example, by treatment according to the process of British specification No. 26460/1912 new dyestuffs are obtained which have retained their solubility in water but contain chromium and still have the character of chrome mordant dyestuffs. Depending on the proportion of chromium compound used in their preparation or on the reaction conditions, the proportion of chromium combined with the dyestuff may vary within certain limits, either all of the groups present which are capable of being chromed or only a part thereof being saturated by chromium. Instead of chromium other trivalent metals, for example iron, can be introduced into the dyestuffs.

If the dyestuffs are treated with compounds of bivalent metals instead of with compounds of trivalent metals there are also obtained water-soluble dyestuffs containing metal in complex form and in part having shades quite different from those of the parent dyestuff. They have likewise the character of mordant dyestuffs and constitute a valuable addition to this class of dyestuffs.

The new dyestuffs may also contain several different metals simultaneously. For example, the compounds into which a bivalent metal has already been introduced can be converted by treatment with a compound of a trivalent metal into water-soluble compounds containing simultaneously in combination a bivalent and a trivalent metal.

All these metal compounds are suitable for application by the customary methods of dyeing and printing with mordant dyestuffs on various fibres, such as cotton, regenerated cellulose artificial silk, natural silk and so on. Generally they yield shades which are faster than those obtainable in an analogous manner with the corresponding non-metallized dyestuffs.

In particular these metal compounds can be printed on the fibre in a suitable manner with chromium mordants, for example according to the processes of British Specifications Nos. 26460/1912 and 319457, U. S. Patent No. 1,848,589, and U. S. Patent No. 2,093,377, whereby prints of remarkable properties of fastness are obtained even with a short period of steaming.

The following examples illustrate the invention, the parts being by weight:—

Example 1

23.5 parts of 1-hydroxy-2-amino-4-chlorobenzene-6-sulphonic acid are diazotized in the usual manner with 7 parts of sodium nitrite. The diazo solution is coupled with an alkaline solution of 51.9 parts of the condensation product from salicylic acid sulphochloride and 1:8-aminonaphthol-3:6-disulphonic acid and the monoazo-dyestuff formed is isolated by salting out. When dried the dyestuff is a dark violet powder which dissolves in water to a blue-violet solution. On the addition of alkalies the solution becomes red-violet; on the addition of acids the colour changes towards red. When the dyestuff is printed on cotton with chromium acetate in the usual manner, blue-grey prints are obtained. Silk is dyed with the dyestuff in combination with a suitable chromium mordant in an acid bath reddish-violet shades, which change considerably towards blue when soaped.

If a solution of the dyestuff is heated for some time with a substance yielding chromium, for example chromium lactate, a complex cromium compound of the dyestuff is obtained. When dried this is a blue powder which is soluble in water to a blue-violet solution. The addition of a solution of sodium carbonate causes no alteration in the colour; on the addition of caustic soda the colour changes to grey-blue, whilst the addition of acids causes no colour change. Silk is dyed with the dyestuff in combination with a suitable chromium mordant in an acid bath blue shades, which suffer no change in colour on soaping.

If a solution of the original dyestuff is heated with copper sulphate there is obtained a complex copper compound which can easily be salted out and purified. When dried it is a red-violet powder which is soluble in water to a bluish-red solution, the colour of which is unaltered by the addition of sodium carbonate solution. Caustic soda solution changes the colour towards blue-violet, whilst on the addition of acids the solution becomes redder. The new dyestuff containing copper is remarkably suitable for chrome printing on cotton. There are produced vivid violet shades which are distinguished by good properties of fastness. An addition of urea to the printing colour results in deeper shades and in a better fixation with a shorter steaming period.

Fast violet tints are likewise obtained on viscose artificial silk or natural silk by printing with the dyestuff, chromium lactate and tragacanth or gum thickening and steaming.

The new dyestuff containing copper can be converted by treatment with a chromium salt into a complex chromium compound containing combined chromium in addition to copper. This new compound is also suitable for chrome printing on cotton and likewise yields violet shades.

The nickel compound of the dyestuff can be used with advantage instead of the copper compound. It yields somewhat redder shades on the fibre.

Example 2

22.1 parts of the sodium salt of picramic acid are diazotized in the usual manner with 7 parts of sodium nitrite and the diazo solution is combined with a solution, alkaline with sodium carbonate, of 51.9 parts of the condensation product from salicylic acid sulphochloride and 1:8-aminonaphthol-3:6-disulphonic acid. When dried the new monoazo-dyestuff is a dark violet powder soluble in water to a bluish-red solution. On the addition of alkalies the colour of the solution changes towards red; dilute acetic acid causes no alteration in the colour, whilst dilute mineral acids on the contrary cause a change to light-red. By printing on cotton with the new dyestuff and chromium acetate and steaming for 1 hour greenish-grey prints are obtained, whilst a shorter steaming period leads to dull greyish-violet prints which change towards red on soaping and have a fastness to light and chlorine appreciably inferior to that of the prints which have been steamed for 1 hour.

By heating a solution of the dyestuff to boiling with a substance yielding chromium, for example chromium acetate, there is obtained a complex chromium compound of the dyestuff which can be isolated from its solution by evaporation. When dried it is a green-grey powder soluble in water to a blue-grey solution, the colour of which suffers no change on addition of sodium carbonate or acids, but becomes green on addition of caustic soda. The new chromium compound can be printed on cotton in the usual manner with chromium acetate, yielding with a short or long steaming period very greenish-grey prints of good fastness properties.

Example 3

16.8 parts of 5-nitro-3-amino-2-hydroxy-1-methyl-benzene are diazotized in the usual manner and coupled under alkaline conditions with a solution of 51.9 parts of the condensation product from salicylic acid sulphochloride and 1:8-aminonaphthol-3:6-disulphonic acid. When dried the new monoazo-dyestuff is a dark-violet powder, soluble in water to a blue-violet solution, the colour of which is changed towards red-violet by the addition of alkalies, towards light-red by the addition of dilute acids. The solution in concentrated sulphuric acid is blue-violet. By printing on cotton with the new dyestuff and chromium acetate and steaming for one hour reddish-grey prints are obtained.

The copper compound of the new dyestuff, which may be obtained in the usual manner, is soluble in water to a red-violet solution, the colour of which is changed towards blue-violet by the addition of alkalies, whilst the addition of dilute acids gives no change of the color. When printed on cotton in the usual manner with chromium acetate, the new copper compound yields vivid red-violet prints, which are distinguished by good properties of fastness. The nickel compound of the new dyestuff behaves in a similar manner as the copper compound. The copper compound is very suitable for printing on natural silk or on regenerated cellulose artificial silk with the aid of chromium lactate as mordant.

Example 4

18.85 parts of 1-amino-2-hydroxy-3-nitro-5-chlorobenzene are diazotized in the usual manner, the solution is combined with a caustic alkaline solution of 51.9 parts of the condensation product from salicylic acid sulphochloride and 1:8-aminonaphthol-3:6-disulphonic acid and the monoazo-dyestuff formed is isolated by salting out. When dried the new monoazo-dyestuff is a greenish-blue powder soluble in water to a reddish-blue solution, the colour of which is changed towards light-red by the addition of acids. The dyestuff yields grey-blue prints when printed on cotton with chromium acetate in the usual manner. It dyes silk in the presence of a suitable chromium mordant reddish-blue shades which become appreciably duller on soaping.

By heating a solution of the dyestuff with a suitable substance yielding chromium there is obtained a new chromium compound soluble in water to a blue solution which suffers no change in colour on the addition of sodium carbonate solution or acids and becomes somewhat greener on the addition of caustic soda. The new chromium compound dyes silk in an acid bath with the aid of a suitable chromium mordant greenish-blue shades, the colour of which is not changed by soaping.

By heating a solution of the original dyestuff with a copper salt a complex copper compound is obtained which is soluble in water to a violet solution. The solution suffers no change in colour on the addition of sodium carbonate solution or dilute acids and becomes blue on the addition of caustic soda solution. The new copper compound dyes natural silk with the aid of a suitable chromium mordant vivid violet shades of good fastness to light, the colour of which is not altered by soaping. The new copper compound is also suitable for chrome printing on cotton.

Example 5

23.3 parts of ortho-amino-para-sulphosalicylic acid are diazotized in the usual manner with 7 parts of sodium nitrite and combined with a solution, alkaline with sodium carbonate, of 51.9 parts of the condensation product from salicylic acid sulphochloride and 1:8-aminonaphthol-3:6-disulphonic acid to produce a monoazo-dyestuff. When dried the new dyestuff is a lilac coloured powder soluble in water to a bluish-red solution which changes towards weak yellow-red on the addition of dilute acids. The dyestuff yields violet shades on cotton when printed in the usual manner with chromium acetate.

By treatment with a compound yielding copper a red-violet dyestuff is obtained soluble in water to a red solution which undergoes no change in colour on the addition of acids. When printed on cotton in the usual manner with chromium acetate the new copper compound yields vivid, very reddish-violet shades of good properties of fastness.

Example 6

18.8 parts of 4-nitro-6-chloro-2-amino-1-hydroxybenzene are diazotized in the usual manner with 7 grams of sodium nitrite and the diazo solution is combined with a caustic alkaline solution of 51.9 parts of the condensation product from salicylic acid sulphochloride and 1:8-aminonaphthol-3:6-disulphonic acid. When printed on cotton with chromium acetate and steamed for 1 hour the dyestuff yields reddish-grey prints and when steamed for 8 minutes dull violet prints.

By heating a solution of the dyestuff for a long time with a substance which yields chromium, for example chromium acetate, there is obtained a complex chromium compound which yields neutral grey prints of good fastness properties when printed in the usual manner with chromium acetate and steamed for a short or long period.

The copper compound of the new dyestuff, which may be obtained in the usual manner, is a violet powder, which dissolves in water to a red-violet solution. On the addition of alkalies the solution becomes blue-violet, whilst the addition of diluted acids causes no colour change. The copper compound of the dyestuff is remarkably suitable for chrome printing on cotton, regenerated cellulose artificial silk or natural silk. There are produced vivid red-violet shades, which are distinguished by good properties of fastness.

Example 7

16.8 parts of 5-nitro-3-amino-4-hydroxy-1-methylbenzene are diazotized in the usual manner with 7 parts of sodium nitrite and the solution is combined with a caustic alkaline solution of 51.9 parts of the condensation product from salicylic acid sulphochloride and 1:8-aminonaphthol-3:6-disulphonic acid. When dried the new monoazo-dyestuff is a green-blue powder soluble in water to a blue solution. The colour of the solution becomes redder on the addition of alkali and changes towards light-red on the addition of acids. The dyestuff yields steel-blue prints in chrome printing on cotton.

The chromium compound of the dyestuff prepared in the usual manner dissolves in water to a reddish-blue solution which undergoes no change on the addition of sodium carbonates or acids, but becomes greenish-blue on the addition of caustic soda solution. Fast grey-blue shades are obtained in chrome printing on cotton.

Example 8

22.3 parts of 1-hydroxy-2-amino-4-chlorobenzene-6-sulphonic acid are diazotized in the usual manner and coupled under alkaline conditions with a solution of 51.9 parts of the condensation product from salicylic acid sulphochloride and 1:8-aminonaphthol-4:6-disulphonic acid. When dried the new monoazo-dyestuff is a dark violet powder, soluble in water to a blue-violet solution, the colour of which is changed towards red by the addition of alkalies, towards light-red by the addition of dilute acids. The solution in concentrated sulphuric acid is blue-violet. By printing on cotton with the new dyestuff and chromium acetate and steaming for one hour dull, blue-violet prints are obtained.

The copper compound of the new dyestuff, which may be obtained in the usual manner, is soluble in water to a red-violet solution, the colour of which is not changed by the addition of dilute acids. When printed on cotton in the usual manner with chromium acetate, the new copper compound yields vivid red-violet prints, which are distinguished by good properties of fastness, especially by good fasteness to washing and light.

It is also possible in accordance with the invention to prepare a large number of other dyestuffs of which some are illustrated in the following table:

Dyestuffs by coupling the following diazotized ortho-aminophenols with the condensation product from salicylic acid sulphochloride and 1:8-aminonaphthol-3:6-disulphonic acid:

| Diazotized ortho-aminophenol | Shades obtained by chrome printing— | |
|---|---|---|
| | Of the dyestuff on cotton | Of the copper compound of the dyestuff on cotton |
| Para-chloro-ortho-amino salicylic acid. | Blue-violet | Red-violet. |
| 4-chloro-2-aminophenol | Reddish grey-blue | Do. |
| 5-nitro-2-aminophenol | Greenish-blue | Violet. |
| 5-nitro-4-chloro-2-aminophenol. | Greyish-blue | Blue-violet. |
| 4-nitro-2-aminophenol-6-sulphonic acid. | Violet-grey | Red-violet. |

Similar dyestuffs can be obtained with analogous results by using in the foregoing examples corresponding parts of 1:8-aminonaphthol-4-monosulphonic acid.

What we claim is:—

1. A process for producing mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-amino-naphthol-compound substituted in the amino group by an —SO$_2$-aryl-ortho-hydroxy-carboxylic acid radical.

2. A process for producing mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic- nitro- and sulpho-radicals in an alkaline medium with a product of the condensation of a 1:8-amino-naphtholsulphonic acid with a sulphosalicylic acid chloride.

3. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-amino-naphthol-compound substituted in the amino-group by an —SO$_2$-aryl-ortho-hydroxycarboxylic acid radical and treating the mono-azo-dyestuff thus obtained with a metal yielding agent.

4. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-amino-naphtholsulphonic acid substituted in the amino-group by an —SO$_2$-aryl-ortho-hydroxycarboxylic acid radical and treating the monoazo-dyestuff thus obtained with a metal yielding agent.

5. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol-3:6-disulphonic acid substituted in the amino-group by an —SO$_2$-aryl-ortho-hydroxycarboxylic acid radical and treating the monoazo-dyestuff thus obtained with a metal yielding agent.

6. A process for producing water-soluble metal compounds of mordant ortho-hydroxy-monoazo-dyestuffs, which comprises combinining a diazo compound of an amine selected from the group consisting of ortho-amino-phenol and substituted ortho-amino-phenols, the substituents being selected from the group consisting of halogen, alkyl, carboxylic, nitro and sulpho-radicals in an alkaline medium with a 1:8-aminonaphthol compound substituted in the amino-group by an —SO$_2$-salicylic acid radical and treating the monoazo-dyestuff thus obtained with a metal yielding agent.

7. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol-3:6-disulphonic acid substituted in the amino-group by an —SO$_2$-salicylic acid radical and treating the mono-azo-dyestuff thus obtained with a metal yielding agent.

8. A process for producing water-soluble metal compounds of mordant ortho-hydroxy-monoazo-dyestuffs, which comprises combining a diazo compound of an ortho-amino-phenol-sulphonic acid in an alkaline medium with a 1:8-aminonaphthol-3:6-disulphonic acid substituted in the amino-group by an —SO$_2$-salicylic acid radical and treating the monoazo-dyestuff thus obtained with a metal yielding agent.

9. A process for producing water-soluble metal compounds of mordant ortho-hydroxy-monoazo-dyestuffs, which comprises combining the diazo-compound of 1-hydroxy-2-amino-4-chlorobenzene-6-sulphonic acid in an alkaline medium with a 1:8-aminonaphthol compound substituted in the amino-group by an —SO$_2$-aryl-ortho-hydroxycarboxylic acid radical and treating the monoazo-dyestuff thus obtained with a metal yielding agent.

10. A process for producing water-soluble metal compounds of mordant ortho-hydroxy-monoazo-dyestuffs, which comprises combining the diazo-compound of 1-hydroxy-2-amino-4-chlorobenzene-6-sulphonic acid in an alkaline medium 1:8-aminonaphthol-3:6-disulphonic acid substituted in the amino group by an —SO$_2$-salicylic acid radical and treating the monoazo-dyestuff obtained with a metal yielding agent.

11. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol compound substituted in the amino-group by an —SO$_2$-aryl-ortho-hydroxycarboxylic acid radical and treating the monoazo-dyestuff thus obtained with an agent yielding a bivalent metal.

12. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol compound substituted in the amino-group by an —SO$_2$-aryl-ortho-hydroxycarboxylic acid radical and treating the monoazo-dyestuff thus obtained with a copper yielding agent.

13. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol compound substituted in the amino-group by an —SO$_2$-aryl-ortho-hydroxycarboxylic acid radical and treating the monoazo-dyestuff thus obtained with copper sulphate.

14. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol compound substituted in the amino-group by an —SO$_2$-aryl-ortho-hydroxycarboxylic acid radical and treating the monoazo-dyestuff thus obtained with an agent yielding a trivalent metal.

15. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol compound substituted in the amino-group by an —SO$_2$-aryl-ortho-hydroxycarboxylic acid radical and treating the monoazo-dyestuff thus obtained with a chromium yielding agent.

16. A process for producing water-soluble metal compounds of mordant ortho-hydroxy-monoazo-dyestuffs, which comprises combining a diazo compound of an amine selected from the group consisting of ortho-amino-phenol and substituted ortho-amino-phenols, the substituents being selected from the group consisting of halogen, alkyl, carboxylic-, nitro- and sulpho-radicals in an alkaline medium with a 1:8-aminonaphthol compound substituted in the amino-group by an —SO$_2$-aryl-ortho-hydroxycarboxylic acid radical and treating the monoazo-dyestuff thus obtained with an agent yielding a bivalent metal and with an agent yielding a trivalent metal.

17. A process for producing water-soluble metal compounds of mordant ortho-hydroxy-monoazo-dyestuffs, which comprises combining a diazo compound of 1-hydroxy-2-amino-4-chlorobenzene-6-sulphonic acid in an alkaline medium with a 1:8-aminonaphthol-3:6-disulphonic acid substituted in the amino-group by the —SO₂-salicylic acid radical.

18. A process for producing water-soluble metal compounds of mordant ortho-hydroxy-monoazo-dyestuffs, which comprises combining a diazo compound of 1-hydroxy-2-amino-4-chlorobenzene-6-sulphonic acid in an alkaline medium with a 1:8-aminonaphthol-3:6-disulphonic acid substituted in the amino-group by the —SO₂-salicylic acid radical and treating the monoazo-dyestuff thus obtained with copper sulphate.

19. Water-soluble metal compounds of mordant ortho-hydroxy-monoazo-dyestuffs, corresponding to the following general formula:

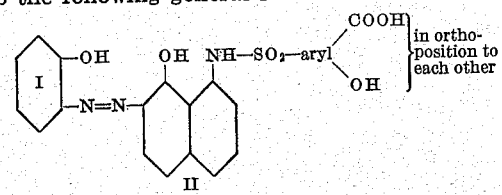

wherein the benzene nucleus I and the naphthalene-nucleus II bear further substituents selected from the group consisting of halogen, alkyl, carboxylic, nitro and sulpho, these dyestuffs containing at least one metal in complex combination.

20. Water-soluble metal compounds of mordant ortho-hydroxy-monoazo-dyestuffs, corresponding to the following general formula:

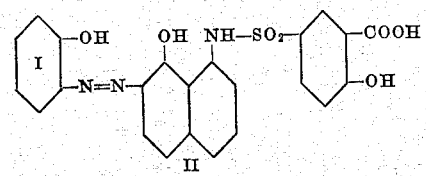

wherein the benzene nucleus I and the naphthalene-nucleus II bear further substituents selected from the group consisting of halogen, alkyl, carboxylic, nitro and sulpho, these dyestuffs containing at least one metal in complex combination.

21. Water-soluble metal compounds of mordant ortho-hydroxy-monoazo-dyestuffs, corresponding to the following general formula:

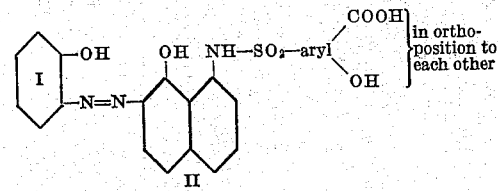

wherein the benzene nucleus I and the naphthalene nucleus II bear further substituents selected from the group consisting of halogen, alkyl, carboxylic, nitro and sulpho, these dyestuffs containing copper in complex combination.

22. Water-soluble metal compounds or mordant ortho-hydroxy-monoazo-dyestuffs, corresponding to the following general formula:

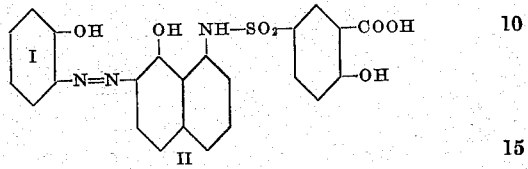

wherein the benzene nucleus I and the naphthalene nucleus II bear further substituents selected from the group consisting of halogen, alkyl, carboxylic, nitro and sulpho, these dyestuffs containing chromium in complex combination.

23. The mordant ortho-hydroxy-monoazo-dyestuff, which may correspond to the following formula:

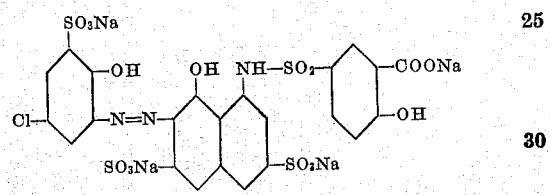

which dyestuff, after being dried and pulverized, represents a dark-violet powder dissolving in water to a blue-violet solution, changing to red-violet on adding alkali and to red on adding acid thereto and yielding, when printed on cotton together with a chromium mordant blue-grey shades, when dyed on silk in presence of the mordant reddish-violet shades changing towards blue, when soaped.

24. The water-soluble copper compound of a mordant ortho-hydroxy-monoazo-dyestuff, corresponding to the following probable formula:

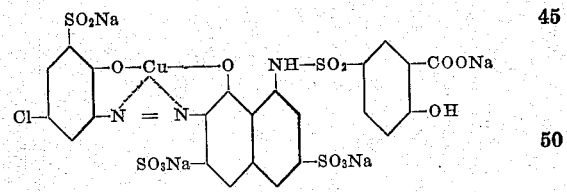

which compound, after being dried and pulverized, represents a red-violet powder dissolving in water to a bluish-red solution, not changing its colour, when adding a sodium carbonate solution, but changing same towards blue-violet with a caustic soda-solution and towards red with acid, yielding, when used in chrome printing on cotton, natural silk and viscose, vivid violet shades of good fastness properties.

MAX MÜLLER.
ROGER RATTI.